US009229550B1

(12) United States Patent
Coley

(10) Patent No.: US 9,229,550 B1
(45) Date of Patent: Jan. 5, 2016

(54) PHYSICALLY MODIFYING A CONFIGURABLE USER INTERFACE

(75) Inventor: Christopher Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1053 days.

(21) Appl. No.: 13/306,705

(22) Filed: Nov. 29, 2011

(51) Int. Cl.
*G06F 3/041* (2006.01)
(52) U.S. Cl.
CPC ..................................... *G06F 3/041* (2013.01)
(58) Field of Classification Search
CPC .......... G06F 3/033; G06F 3/016; G06F 3/041
See application file for complete search history.

(56) References Cited

U.S. PATENT DOCUMENTS

| 6,903,871 B2 * | 6/2005 | Page ............................. 359/443 |
| 2004/0207652 A1 * | 10/2004 | Ratti et al. .................... 345/697 |
| 2009/0243817 A1 * | 10/2009 | Son ............................. 340/407.2 |
| 2010/0162109 A1 * | 6/2010 | Chatterjee et al. ............ 715/702 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Andrew Sasinowski
(74) *Attorney, Agent, or Firm* — Lee & Hayes, PLLC

(57) ABSTRACT

A configurable user interface (UI) includes actuators capable of protruding from a surface of the configurable UI to effectively add texture, buttons, knobs, or other virtual objects with which a user may interact. In addition, this document describes a system for supplementing this configurable UI by projecting content onto the surface, such as one or more images corresponding to the set of controls provided by the configurable UI. In addition, the system may identify (e.g., with use of a camera) when a user interacts with the configurable UI and may instruct the configurable UI to physically modify some aspect of the interface in response.

28 Claims, 15 Drawing Sheets

PHYSICALLY MODIFYING A CONFIGURABLE USER INTERFACE

BACKGROUND

Augmented reality environments allow interaction among users and real-world objects and virtual or computer-generated objects and information. This merger between the real and virtual worlds paves the way for new interaction opportunities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
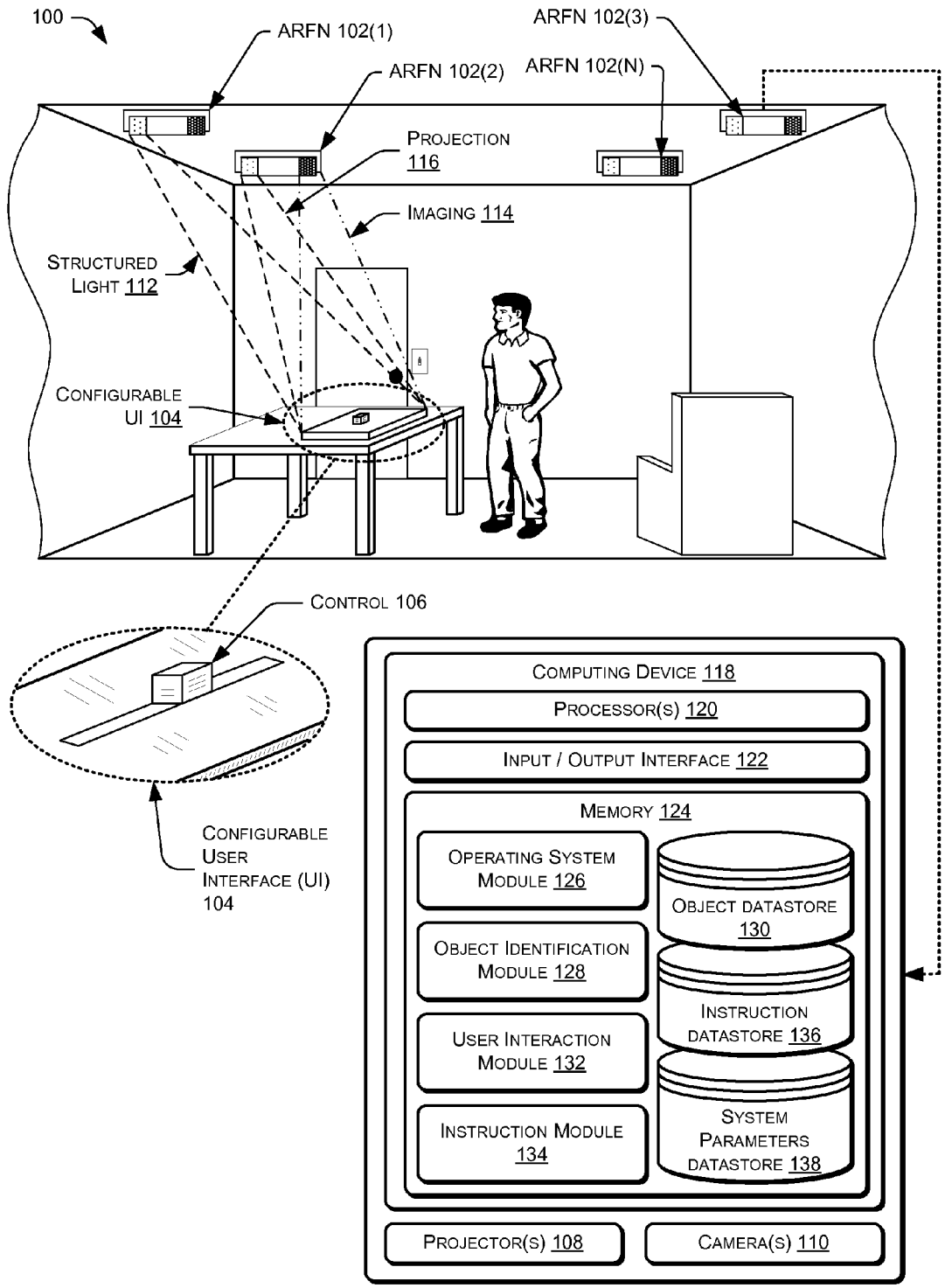
FIG. 1 illustrates an environment that includes several augmented reality functional nodes (ARFNs) and a configurable user interface (UI) in communication with one or more of the ARFNs. The configurable UI dynamically provides different controls for operating different devices within the environment or otherwise. The ARFNs, meanwhile, detect when a user is manipulating the controls and, in response, may instruct the configurable UI to physically modify the controls. The ARFNs may also modify devices operated by the controls in accordance with the user's manipulations of the controls.

This document describes, in part, a configurable user interface (UI) that includes elements capable of protruding from a surface of the configurable UI to effectively add texture, buttons, knobs, or other virtual objects with which a user may interact. In addition, this document describes a system for supplementing this configurable UI by projecting content onto the surface, such as an image corresponding to the set of controls provided by the configurable UI. In addition, the system may identify (e.g., with use of a camera) when a user interacts with the configurable UI and may instruct the configurable UI to physically modify some aspect of the interface in response.

In addition, the system may modify devices controlled by the user via the configurable UI. For instance, if the user requests that the configurable UI be formed to represent a television control and, thereafter, selects to turn up a volume of the television using the configurable UI, the system may correspondingly instruct the television to raise the volume. To do so, the system may couple with devices within and outside the environment.

For instance, a configurable user interface described herein may include multiple pins, one or more actuators, and one or more drivers for instructing the actuators to drive the pins to different vertical positions. Furthermore, envision that the driver, pins, and actuators couple to an underlying substrate on a bottom of the configurable UI and that a flexible top layer resides atop the pins. As described below, this example configurable UI may create different controls or other virtual elements by driving pins to different vertical positions.

In addition, the configurable UI may couple wired or wirelessly with a system having a projector configured to project content onto the UI. The system may further include a camera configured to image the environment and a mechanism for receiving and interpreting user requests within the environment. In this instance, a user could request (e.g., via a visual gesture, an audible command, etc.) that the configurable UI be formed to include one or more particular controls for performing some function, such as a television controller, a stereo system controller, a keyboard, a dial pad, or the like.

In response, the system may instruct the configurable UI to drive pins of the UI to corresponding vertical positions for the purpose of forming the control(s) requested by the user. After the configurable UI forms the requested control(s), the user may begin interacting with these controls. For instance, if the user requests that the configurable UI be configured to represent a volume slider for a stereo system within the environment, the configurable UI may drive pins to form a control that represents a slider.

Thereafter, the user may attempt to manipulate the control by, for example, attempting to push the slider to the right, just as the user would operate a real-world volume slider. The camera of the system may continually or periodically image the environment and may identify the user attempting to push the slider to the right. In addition or in the alternative, the configurable UI may sense the user attempting to push the slider to the right via strain gauges or other sensing means disposed on the pins themselves.

In response to the system identifying the user's attempt to manipulate the control, the system may generate and send an instruction to the configurable UI indicating this manipulation. In response to the instruction, the configurable UI may physically modify the UI such that it appears to the user that the slider is sliding to the right. For instance, the configurable UI may lower pins vertically on the left side of the control while simultaneously raising pins on the right side of the control. As such, to the user the control appears to move to from the left to the right on the configurable UI surface. Meanwhile, the system may modify the controlled device (here, the stereo system within the environment) according to the user's manipulation. For instance, the system may instruct the stereo system to increase its volume.

While one example has been provided, it is to be appreciated that multiple other controls may be similarly utilized. For instance, the configurable UI may simulate depressible buttons, rotatable knobs, keyboards, and/or any other similar or different type of control. For example, a user may compose an email or other communication using a keyboard formed by the configurable UI. To do so, the system may project symbols corresponding to the keyboard on the appropriate keys, and the camera of the system may identify the symbols of the keyboard being selected by the user. In response to identifying these symbols, the system may correspondingly compose the requested email.

In some instances, the configurable UI may provide additional haptic feedback to the user in addition to or via the physical alteration of the actuatable pins on the surface of the UI. For instance, the configurable UI may implement one or more circuits to drive a low-level current that is detectable to a user, may utilize one or more piezoelectric actuators to provide haptic feedback, may provide the haptic feedback by altering the pins themselves (e.g., shaking or bumping the pins to simulate a detent), or may provide the additional haptic feedback in any other manner. To provide an example, when a user rotates a knob on the configurable UI, the configurable UI may provide a low-level current that is perceptible yet harmless to the user. Or, the configurable UI may trigger a piezoelectric actuator perceptible to the user. In either instance, the haptic feedback may inform the user that the UI or the system is accepting the input of the user.

Furthermore, while the above discussion focuses on a configurable UI that includes multiple actuatable pins, it is to be appreciated that other embodiments may utilize other elements and techniques. For instance, the configurable UI may comprise a container that includes a deformable material therein and that conforms to the deformable material. For instance, the configurable UI may comprise fluid, iron filings, or other material that is able to selectively deform within the conformable container to form the desired controls described above.

Furthermore, in one example the system described above may identify the objects and user actions within the environment by a combination of a structured light source, such as an image projector configured to generate structured light patterns, and one or more cameras to image those patterns. The projector and camera(s) may further be incorporated into a single unit and designated as an augmented reality functional node (ARFN). In other implementations, other combinations of elements such as projectors, cameras, microphones, ultrasound transducers, depth sensing cameras, weight sensors, touch sensors, tactile output devices, and so forth may be also be present within or coupled to the ARFN. For convenience, and not by way of limitation, some of the examples in this disclosure refer to the use of structured light for the characterization of the physical environment of the scene including objects therein. However, in addition to or in place of structured light, other techniques may be used, such as light detection and ranging (LIDAR), optical time-of-flight, ultrasonic ranging, stereoscopic imaging, radar, and so forth either alone or in combination with one another.

Example Environment and Configurable User Interface (UI)

FIG. 1 illustrates an environment 100 that includes several augmented reality functional nodes (ARFNs) 102(1), . . . , 102(N) and a configurable user interface (UI) 104 in communication with one or more of the ARFNs 102(1)-(N). The configurable UI 104 dynamically provides different controls for operating different devices within the environment 100 or otherwise. As illustrated, the configurable UI 104 comprises a physical hardware device that a user may manipulate or otherwise interact with.

The ARFNs 102(1)-(N), meanwhile, detect when a user is manipulating a control 106 of the UI 104 and, in response, may instruct the configurable UI 104 to physically modify the control 106. In addition, the ARFNs 102(1)-(N) may communicate with and control devices operated by the control 106 in accordance with the user's manipulations of the control 106. While the environment 100 illustrates four ARFNs, in some instances an environment may include any other number of ARFNs stationed in different locations throughout the environment.

As illustrated, each ARFN 102 within the environment may include one or more projectors 108 and one or more cameras 110. When active, the projector 108 may project content onto any surface within the environment 100, thereby generating an augmented reality environment that may incorporate real-world objects within the environment 100. The projected content may include electronic books, videos, images, interactive menus, or any other sort of visual content. The camera 110, meanwhile, may function to image the environment to identify objects within the environment, as well as interactions between users and objects within the environment. The ARFNs may also provide audio output, control other devices within the environment, and/or provide an array of other functions.

In this example, a first ARFN 102(1) projects structured light 112 onto the environment including onto the control 106. The same or a second ARFN 102(2) may thereafter capture images 114 of the environment 100 for the purpose of identifying objects within the room and interactions taking place within the room via deformation of the structured light. For instance, the camera of the ARFN 102(2) may capture deformations in the structured light 116 that indicates that the illustrated user is interacting with and attempting to manipulate the control 106. In response, the ARFN 102(2) or another ARFN may send an instruction to the configurable UI to physically modify the control 106 in accordance with the user's interaction. For instance, if the user slides a slider to the right, the instruction may instruct the configurable UI 104 to simulate the slider moving to the right. Or, if the user rotates a knob on the configurable UI 104, then the instruction may instruct the configurable UI 104 to modify the control to provide some sort of feedback to the user.

In addition, FIG. 1 illustrates that the ARFN 102(2) or another ARFN may provide a visual projection 116 onto the configurable UI 104. In some instances, the visual projection 116 may comprise one or more images that correspond to the control 106. For instance, if the control 106 represents a slider, the visual projection 116 may comprise a slider bar that resides atop the surface of the configurable UI 104. Or, if the configurable UI 104 were in the form of a keyboard, then the visual projection 116 may comprise a visual representation of the symbols (e.g., letters, numbers, etc.) atop the surface of the configurable UI 104.

With use of the system within the environment 100 of FIG. 1, the illustrated user is able to physically manipulate the control 106 and, in response, is able to operate a corresponding device. For instance, the user may be able to operate a television or stereo system within the environment, may be able to compose an email or navigate content available on the Internet, or may utilize the configurable UI 104 in any other manner.

In addition to including the projector 108 and the camera 110, each ARFN within the environment may include an associated computing device 118. Some or the entire computing device 118 may reside within a housing of the ARFN 102 or may reside at another location that is operatively connected to the ARFN 102. The computing device 118 comprises one or more processor 120, an input/output interface 122, and memory 124. The processors 120 may be configured to execute instructions, which may be stored in the memory 124 or in other memory accessible to the processors 120.

The input/output interface 122, meanwhile, may be configured to couple the computing device 118 to other components of the ARFN 102, such as the projector 108, the cameras 110, the configurable UI 104, microphones, other ARFNs 102, other computing devices, and so forth. The coupling between the computing device 118 and the devices may be via wire, fiber optic cable, wireless connection, or the like.

The memory 124, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 118. The memory 124 may reside within a housing of the ARFN, on one or more storage devices accessible on a local network, on cloud storage accessible via a wide area network, or in any other accessible location.

The memory 124 may store several modules, such as instructions, datastores, and so forth that are configured to execute on the processors 120. For instance, the memory 124 may store an operating system module 126, an object identification module 128, an object datastore 130, a user interaction module 132, an instruction module 134, an instruction datastore 136, and a system parameters datastore 138.

The operating system module 126 may be configured to manage hardware and services within and coupled to the computing device 118 for the benefit of other modules. The object identification module 128, meanwhile, may be configured to identify objects within the environment with reference to the object datastore 130. For instance, the object identification module 128 may function to identify a location of the configurable UI 104 within the environment 100 as well as a location and identity of any controls 106 formed by the configurable UI 104. The object datastore 130, meanwhile, is configured to maintain information about objects within or accessible to the environment 100 or users. These objects may be tangible real world objects or virtual objects. Tangible objects include items such as tables, chairs, animals, plants, food containers, printed books, and so forth. Virtual objects include media content such as songs, movies, electronic books, computer generated scenes, media files, and so forth. Virtual objects may include stored copies of those objects or access rights thereto. The object datastore 130 may include a library of pre-loaded reference objects, as well as objects which are temporally persistent within a particular environment, such as a wall, a specific table, a user and so forth. For tangible objects, surface shapes, textures, colors, and other characteristics may be stored Next, the user interaction module 132 functions to receive and interpret commands received from users within the environment 100. For instance, the user interaction module 132 may analyze and parse images captured by the one or more cameras 110 to identify gestures made by users within the environment 100. In response to identifying a predefined gesture, the user interaction module 132 may interpret the gesture and cause the ARFN to perform a corresponding action. For instance, if a user within the environment 100 makes a gesture requesting that the ARFN project a certain piece of content, then the user interaction module 132 may interpret the gesture and cause the projector 108 to project the content. In other instances, the user interaction module 132 identifies commands audibly issued by users within the environment and captured by one or more microphones of the ARFN 102. For instance, the user interaction module 132 may receive an audible command from the illustrated user to form a television control on the configurable UI 104 and, in response, may cause the configurable UI to form the television control. In still other instances, the user interaction module 132 allows users to interface and interact with the ARFN 102 in any way, such as via physical controls, and the like.

The instruction module 134, meanwhile, functions to receive information from the camera 110 indicative of a user interacting with a control 106 on the configurable UI 104 and, in response, map the interaction to a corresponding instruction stored in the instruction datastore 136. For instance, the instruction module 134 may receive an indication that the illustrated user is attempting to move a slider control formed on the configurable UI 104 to the right. In response, the instruction module 134 may identify a corresponding instruction from the datastore 136 to send to the configurable UI 104. Here, for instance, the instruction module 134 may instruct the configurable UI 104 to physically modify the control such that it appears that the control 106 is sliding from the left to the right.

Finally, the system parameters datastore 138 is configured to maintain information about the state of the computing device 118, the projector 108, the cameras 110, the configurable UI 104, and so forth. For example, and as described in detail below, the ARFN 102 may be configured to pan and tilt for the purpose of allowing the projector 108 and the cameras 110 access different areas in the environment 100. As such, the system parameters maintained in the datastore 138 may include current pan and tilt settings of the camera(s) and projector(s), content that the ARFN 102 is currently projecting or otherwise outputting, and the like.

Figure 2:
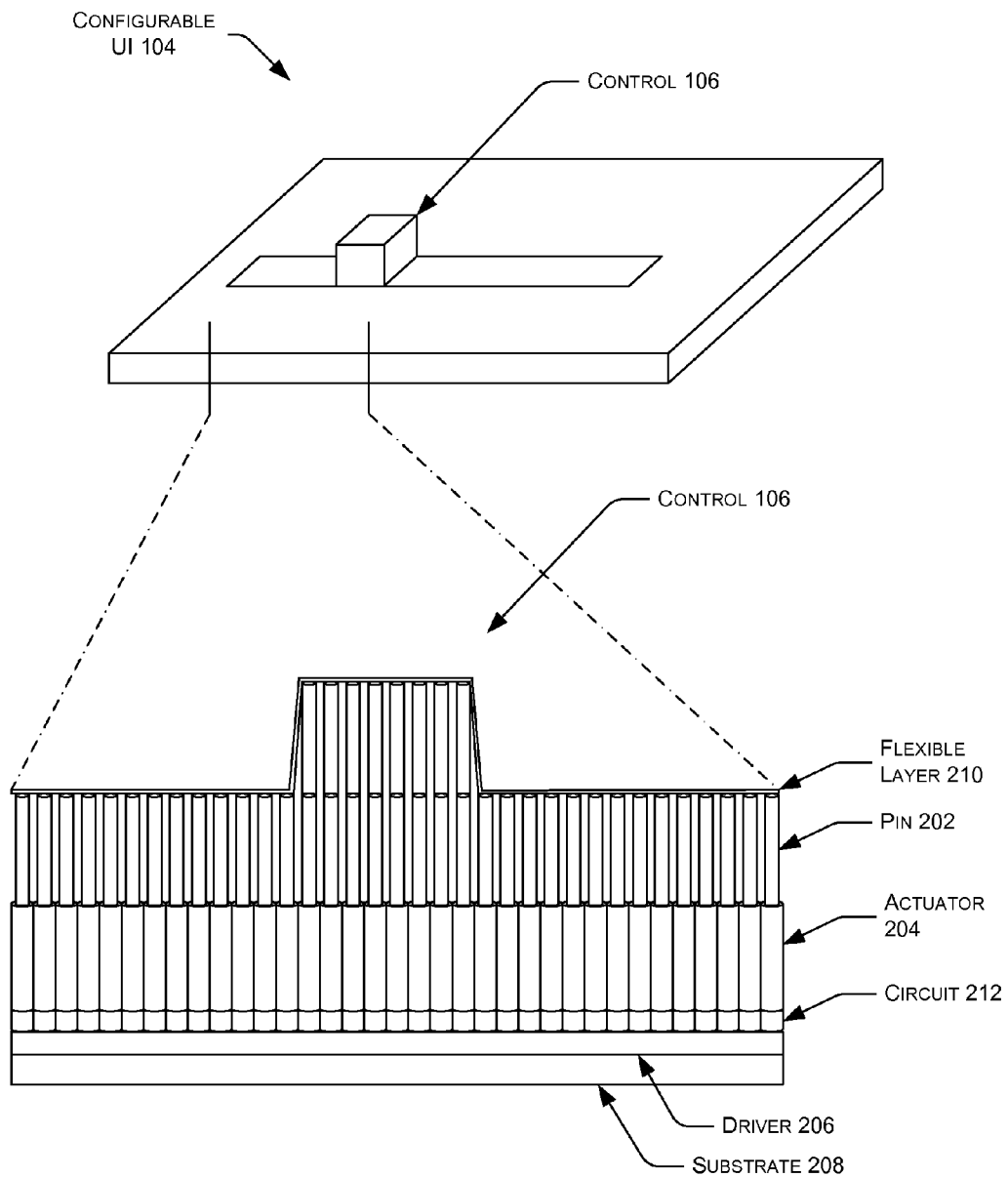
FIG. 2 illustrates one example configurable UI that includes multiple pins, corresponding actuators, and a driver that selectively instructs the actuators to drive one or more of the pins to different vertical positions.

FIG. 2 illustrates one example of the configurable UI 104 from FIG. 1. In this example, the configurable UI 104 includes multiple pins 202 aligned substantially parallel with and adjacent to one another. In addition, the configurable UI 104 includes actuators 204 configured to drive the multiple pins to different vertical positions. In some instances, the pins 202 are formed of a ferromagnetic material and the actuators comprise solenoids configured to drive the pins 202 to different vertical positions by producing a magnetic field. Of course, in other instances the actuators 204 may drive these pins 202 in any other suitable way, such as via mechanical means, electrical means, or the like. Furthermore, while this example illustrates a one-one-correspondence between actuators and pins, in other examples a single actuator may drive multiple pins.

FIG. 2 further illustrates that the example configurable UI 104 includes one or more actuator drivers to cause the actuators 204 to move the pins 202 to the different vertical positions. For instance, in response to receive a request (e.g., from a user, from an ARFN, etc.) to form a particular control, the driver may form the control by instructing one or more of the actuators 204 to drive one or more of the multiple pins 202 to specified vertical positions. In some instances, the illustrated driver 206 includes a row driver and a column driver that collectively function to drive different pins from the matrix formed by the configurable UI 104. In addition, after an ARFN detects (e.g., via information captured by a camera) that a user is manipulating the control in some manner, the driver may physically modify the control by instructing one or more of the actuators 204 to drive one or more of the multiple pins 202 to specified vertical positions.

In addition, the configurable 104 may include a substrate 208 that couples to the driver and/or the actuators. The UI 104 may also include a flexible layer 210 that resides at least partially atop and covers at least a portion of the multiple pins 202. Generally, the flexible layer 210 may be formed from any material that is capable of conforming to the different positions of the pins without puncturing from the force of the pins. For instance, the flexible layer 210 may comprise nylon, latex, silicon, or the like. The substrate 208, meanwhile, may comprise a rigid material in some instances, such as metal, plastic, or the like.

In some implementations, the configurable UI 104 may also include one or more circuits 212 or other haptic-feedback mechanisms (e.g., piezoelectric actuators, etc.). For instance, the UI 104 may include a circuit 212 that is configured to drive a first pin to relatively higher potential and a second, adjacent pin to a relatively lower potential. Therefore, when a user touches the adjacent pins, the user will perceive a slight current caused by the difference in these potentials. As described above, the low current may form a type of haptic feedback informing the user that the control is being operated as requested by the user.

With use of the example components shown in FIG. 2, the configurable UI 104 is able to create and dynamically modify one or more controls 106 as described above. For instance, the configurable UI 104 may create a particular control in response to receiving an instruction to do so from an ARFN and may physically modify the control when the user attempts to maneuver or otherwise interact with the control. Further, the ARFN 102 may cause execution of the desired operations corresponding to the user's manipulation of the controls. For instance, the ARFN 102 may turn a device on or off, alter settings of a device, or perform any other function in accordance with the current control and the user's manipulation of the current control.

While FIG. 2 illustrates one example configurable UI 104, it is to be appreciated that the configurable UI 104 may take any other similar or different form. Furthermore, while the example UI 104 includes a single layer of actuators and pins, in some instances the UI 104 may implement multiple layers. For instance, the configurable UI 104 may utilize a first layer of cylindrical actuators and pins. A second layer of cylindrical actuators and pins may then reside underneath the first layer, such that the pins are able to be driven up through the interstices defined by the first layer of adjacent cylindrical shapes. In these instances, the pins may be formed of a flexible material such that the pins may be driven through and around interfering objects. By utilizing this technique, the configurable UI 104 may include multiple layers of actuators and pins. These multiple layers may provide adjustable controls having a higher resolution than compared with controls formed from a single layer of actuators and pins.

Example Configurable UI Controls

Figure 3A:
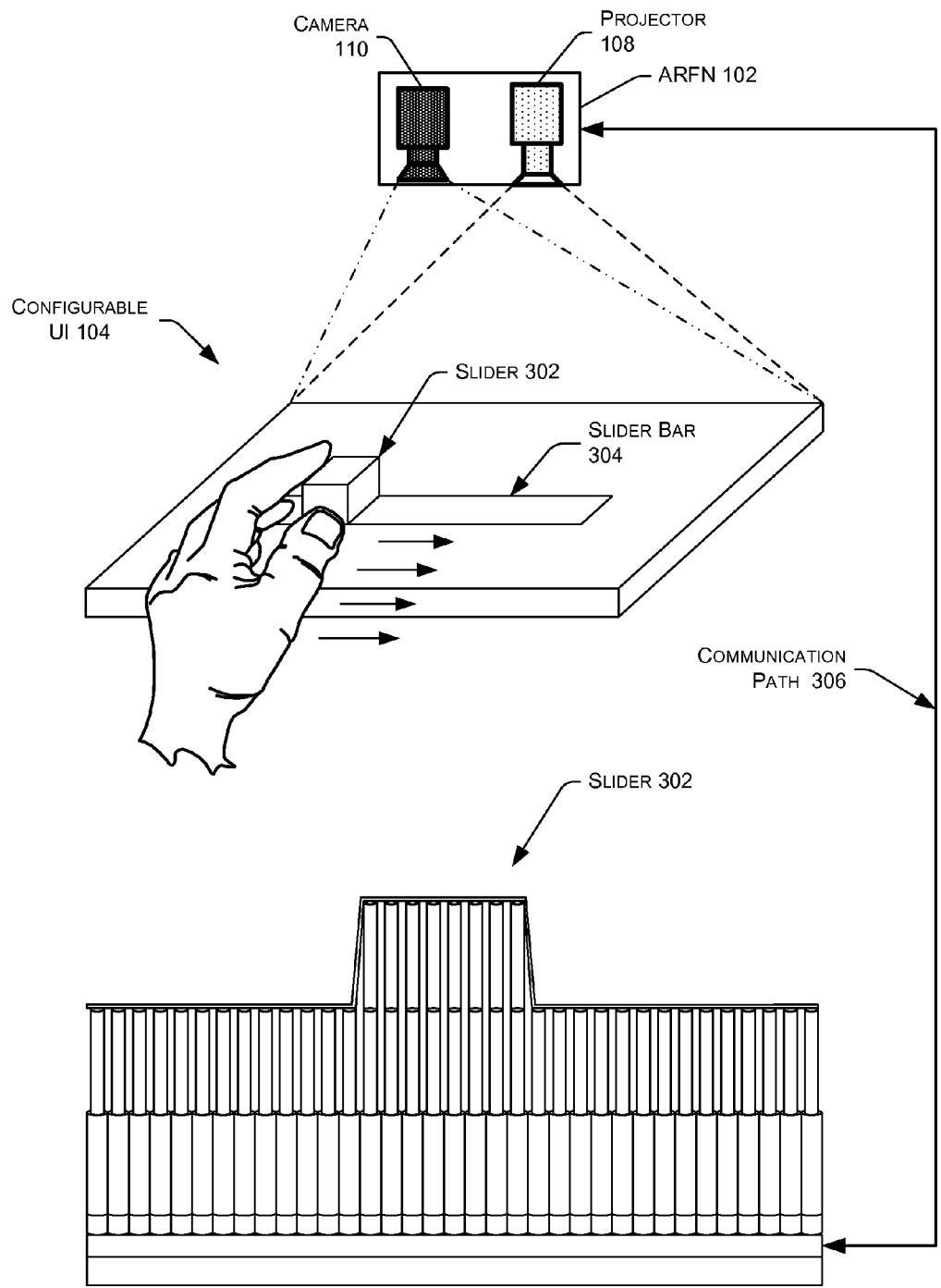
FIGS. 3A-3C illustrate an example control in the form of a slider. These figures also illustrate a user attempting to slide the slider, an ARFN identifying this attempt, and the configurable UI physically modifying the slider in response to receiving an indication of the manipulation from the ARFN.

FIG. 3A illustrates the configurable UI 104 creating an example control in the form of a slider 302. FIG. 3A further illustrates that a camera 110 of an example ARFN 102 may image the configurable UI 104 within the environment to identify the existence of the slider 302 and/or to identify when a user within the environment manipulates the slider 302. To do so, the camera 110 may image the environment for deformations in a structured light pattern projected by the projector 108, as described in further detail below.

To create the slider 302, the UI 104 has driven a set of pins corresponding to the slider vertically higher than the remaining pins of the UI 104. In addition, in this example the projector 108 of the ARFN 102 (or a projector of another ARFN 102) may project an image onto the configurable UI 104 in accordance with the slider. Here, for instance, the projector projects a slider bar 304 onto the UI 104 to help the user appreciate that the control is indeed a slider and to help the user appreciate a distance to which the slider may be moved.

FIG. 3A further illustrates that the ARFN 102 (and one or more other ARFNs within the environment) may communicate with the configurable UI via a communication path 306. While illustrated as a solid line, the ARFN may communicate with the configurable UI 104 in any wired or wireless manner.

In the illustrated example, the user attempts to maneuver the slider 302 by sliding the slider to the right along the projected slider bar 304. The ARFN 102 may identify this interaction via deformation in the structured light pattern and, in response, may provide an instruction to the driver 206 or other component of the configurable UI 104. The instruction may instruct the UI to physically modify the slider 302 such that the slider 302 appears to move to the right.

In addition or in the alternative, the configurable UI 104 may identify when the user attempts to slide the slider or otherwise manipulate a formed control. For instance, the pins of the configurable UI 104 may include strain gauges or other sensing means configured to identify when the user is effectively attempting to bend or otherwise place a force upon the pins by manipulating the control (e.g., sliding a slider, rotating a knob, etc.). This force information may be used instead of, or in addition to, the information captured by the camera of the ARFN 102 for the purpose of determining when to physically modify the configurable UI 104.

Figure 3B:
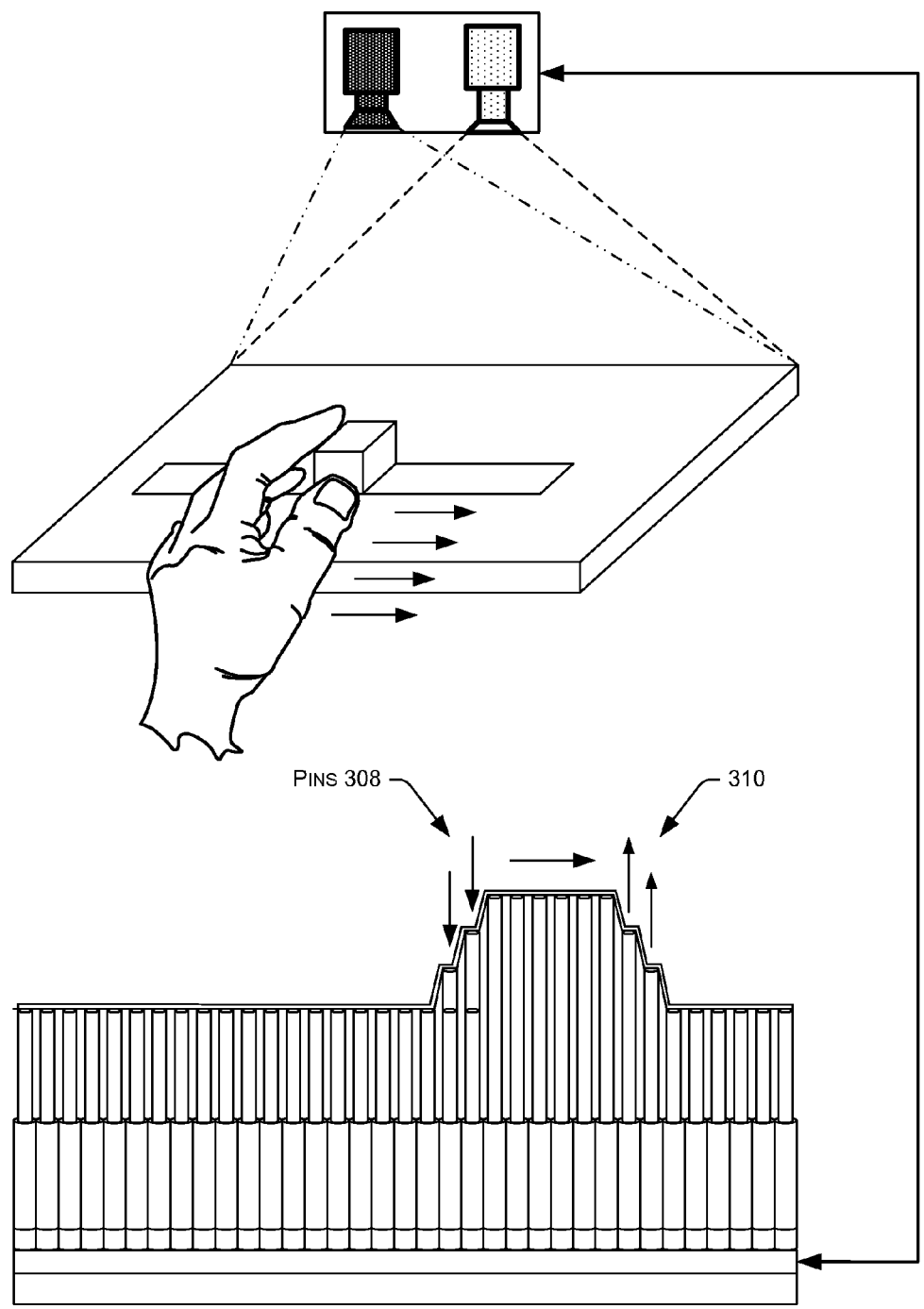

FIG. 3B illustrates the configurable UI 104 after the UI 104 receives the instruction and while the user continues to attempt to move the slider to the right. As illustrated, the driver 206 has driven pins 308 opposite the direction of motion (i.e., pins on the left) downwards, flush with the majority of the pins of the UI 104. Conversely, the driver 206 has driven pins 310 in the direction of motion (i.e., pins on the right) upwards, flush with the pins forming a portion of the slider 302. By driving pins in this manner, the configurable UI 104 is simulating the appearance of a physical slider moving in the direction of motion of the user's hand.

Figure 3C:
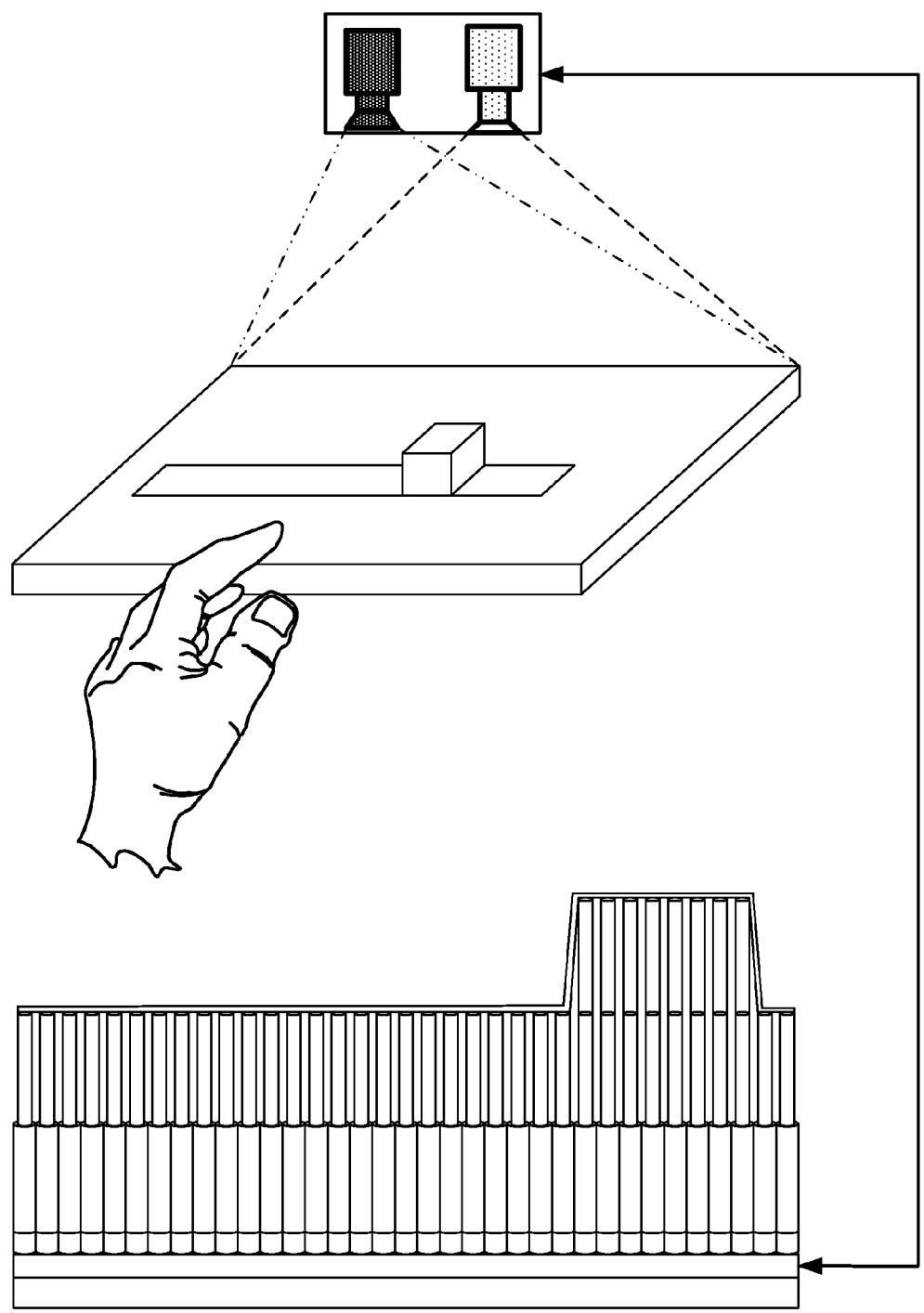

FIG. 3C illustrates the configurable UI 104 after the user has ceased interacting with the slider. As illustrated, the configurable UI 104 has recreated the slider at a location further to the right than the initial position of the slider 302, in accordance with the user's attempt to move the slider in that direction.

Figure 4A:
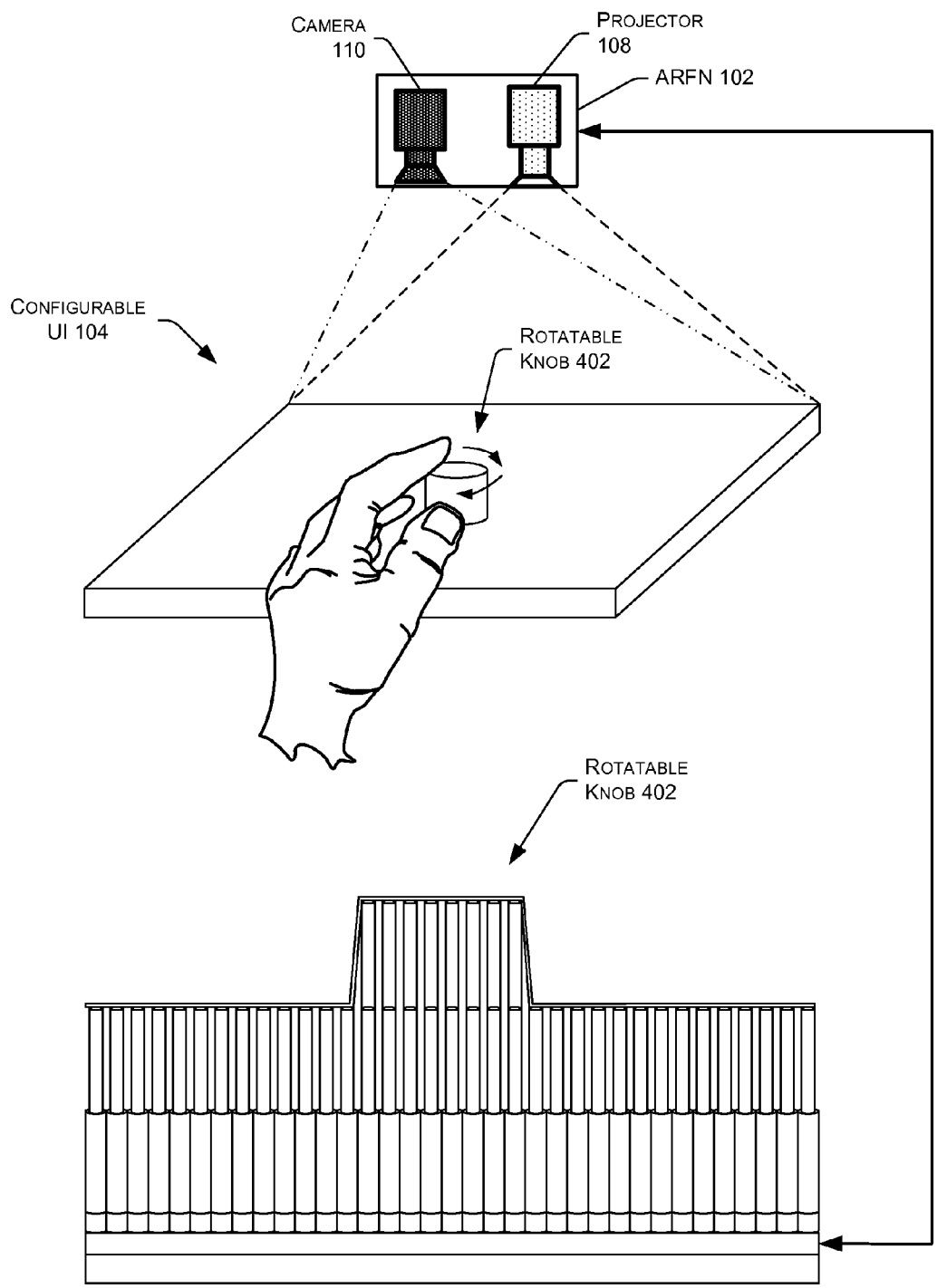
FIGS. 4A-4C illustrate another example control in the form of a rotatable knob. These figures also illustrate a user attempting to rotate the knob, an ARFN identifying this attempt, and the configurable UI physically modifying the knob in response to receiving an indication of the manipulation from the ARFN. In this example, the configurable UI drives pins on a perimeter of the knob upwards and downwards to simulate detents in the knob.
Figure 4B:
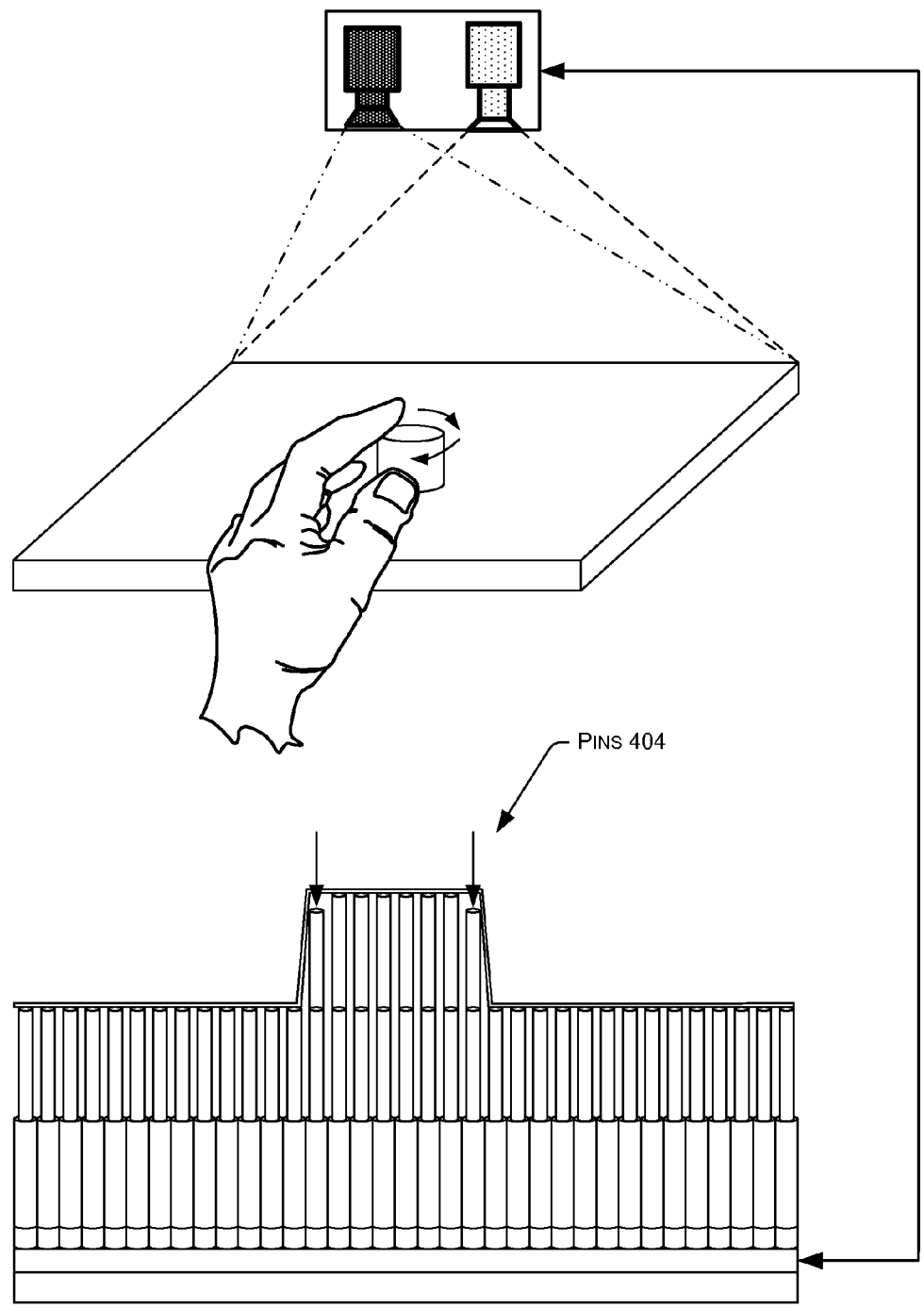
Figure 4C:
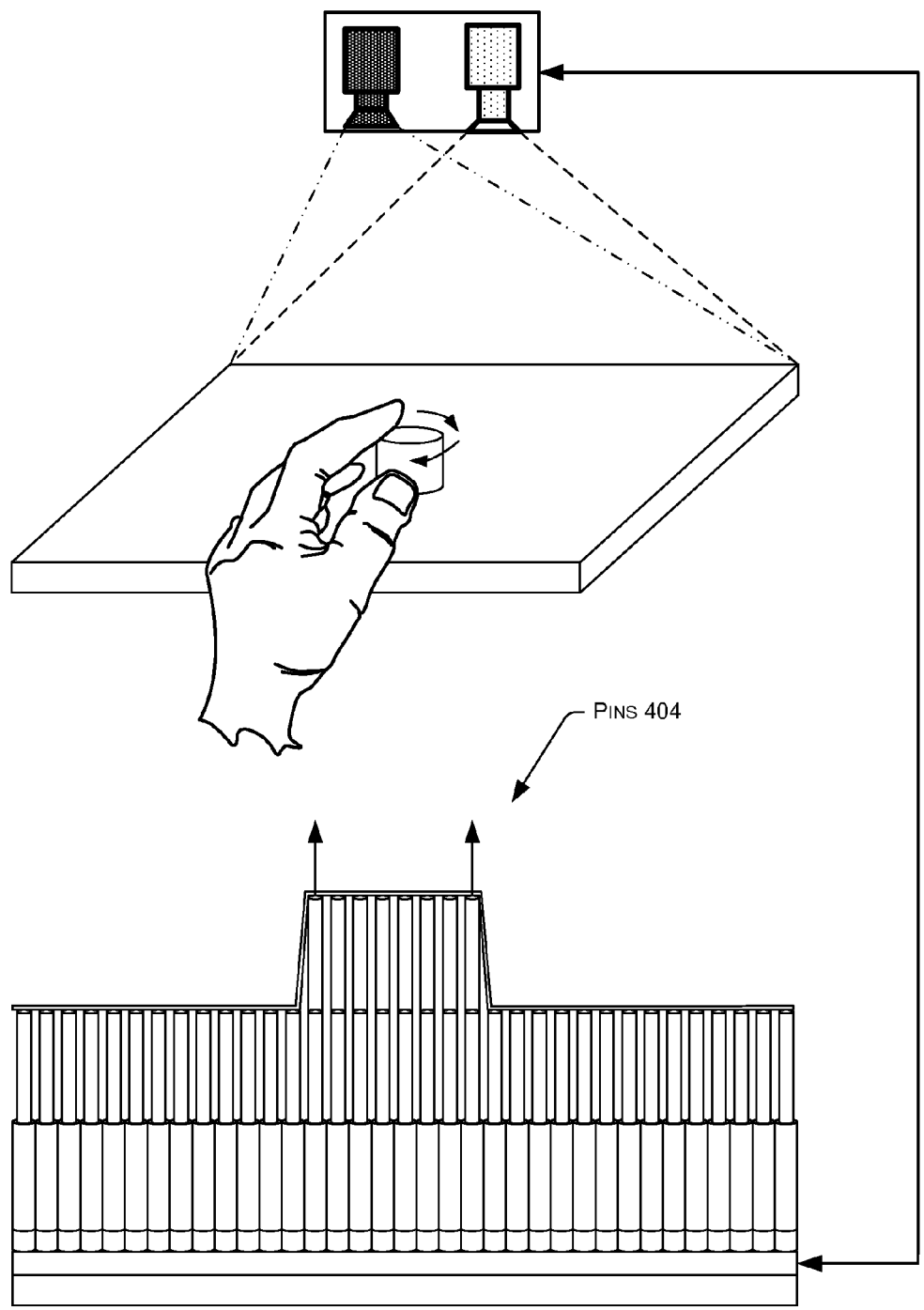

FIG. 4A, meanwhile, illustrates the configurable UI 104 creating an example control in the form of a rotatable knob 402. Here, a user attempts to rotate the knob in a clockwise direction, for example to turn up a volume of a stereo system within the environment. In response, the ARFN 102 may identify this motion by the user and send an instruction to the configurable UI 104 to physically modify the control or to provide haptic feedback to the user in another manner. The ARFN 102 may also instruct a device within the environment (or other corresponding device) to perform the action associated with the manipulation of the control. For instance, when the rotatable knob 402 corresponds to a volume control on a stereo system within the environment, the ARFN 102 may turn up the volume of the stereo system.

FIG. 3B illustrates that in response to receiving the instruction, the driver 206 has driven pins 404 near a perimeter of the knob downwards. FIG. 3C, meanwhile, illustrates that the driver 206 thereafter drives these pins upwards again. The driver may repeat this up and down motion rapidly to provide the user with a sensation similar to that experienced by a user from a rotatable knob that implements physical detents. Of course, while one example type of feedback has been provided, it is to be appreciated that the configurable UI 104 may provide feedback to the user in any other manner, such as by physically modifying the control in a different manner, driving a low current through one or more of the pins, executing a piezoelectric actuator, or the like.

Figure 5A:
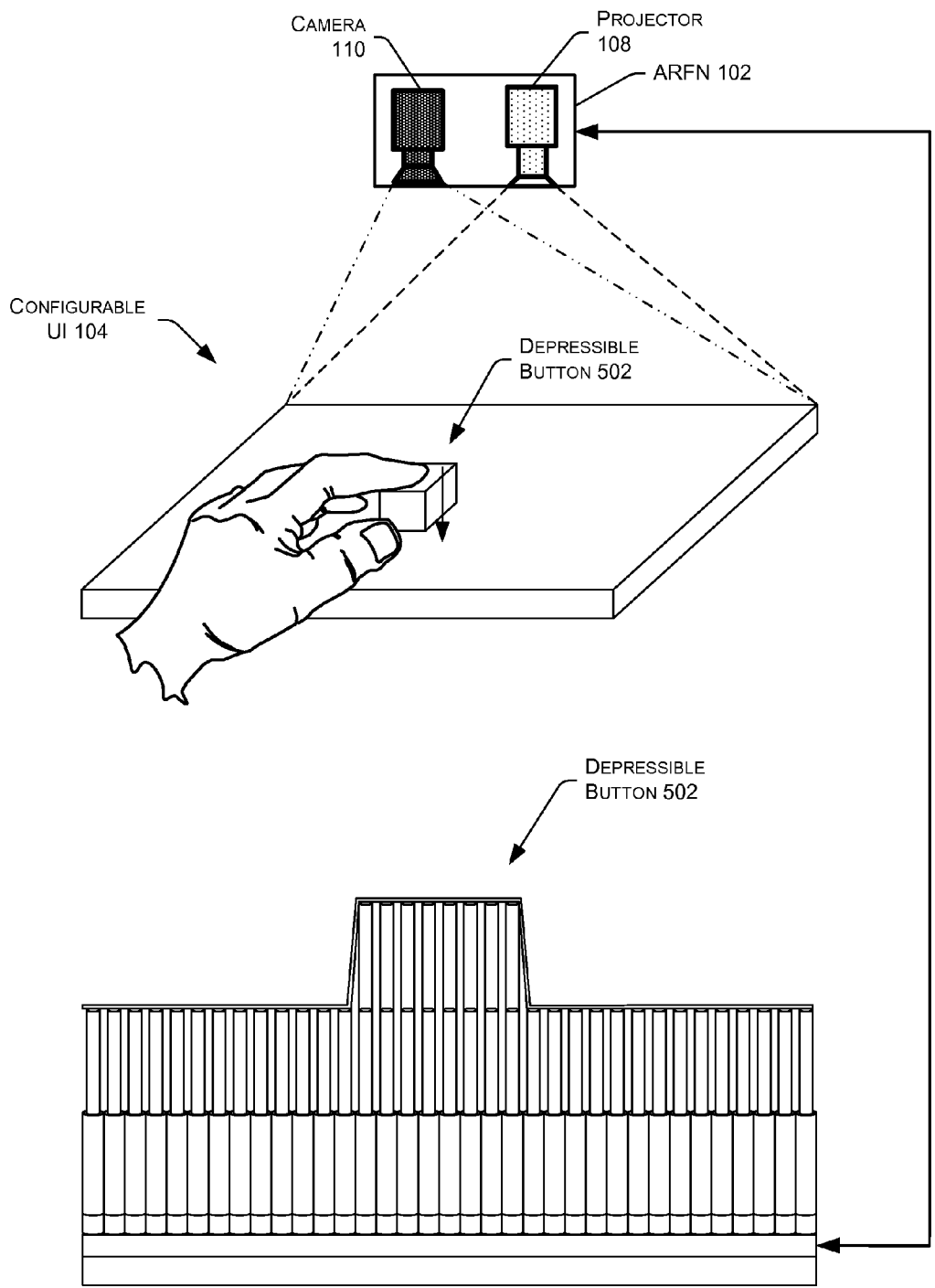
FIGS. 5A-5C illustrate another example control in the form of a depressible button. These figures also illustrate a user attempting to press down on the button, an ARFN identifying this attempt, and the configurable UI physically modifying the button in response to receiving an indication of the manipulation from the ARFN. In this example, the configurable UI either drives pins on the button downwards and then upwards, or provides a resistance to allow the pins to move downwards in response to the user's actuation and, thereafter, to return to their initial vertical positions.

FIG. 5A illustrates the configurable UI 104 creating an example control in the form of a depressible button 502. Here, the ARFN 102 identifies the user attempting to press down on the button 502 and, in response, sends an instruction to physically modify the button 502 to the configurable UI 104.

Figure 5B:
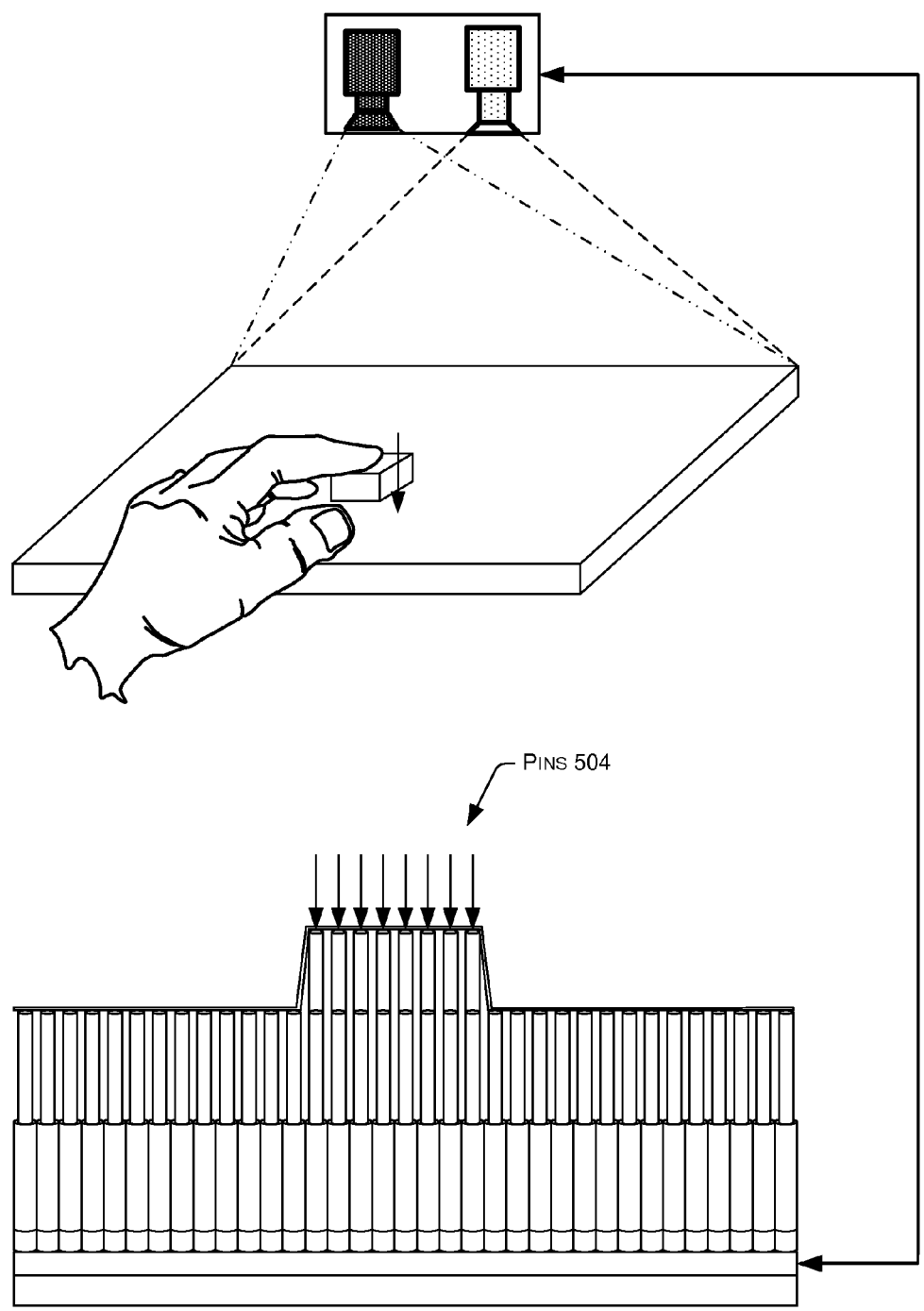
Figure 5C:
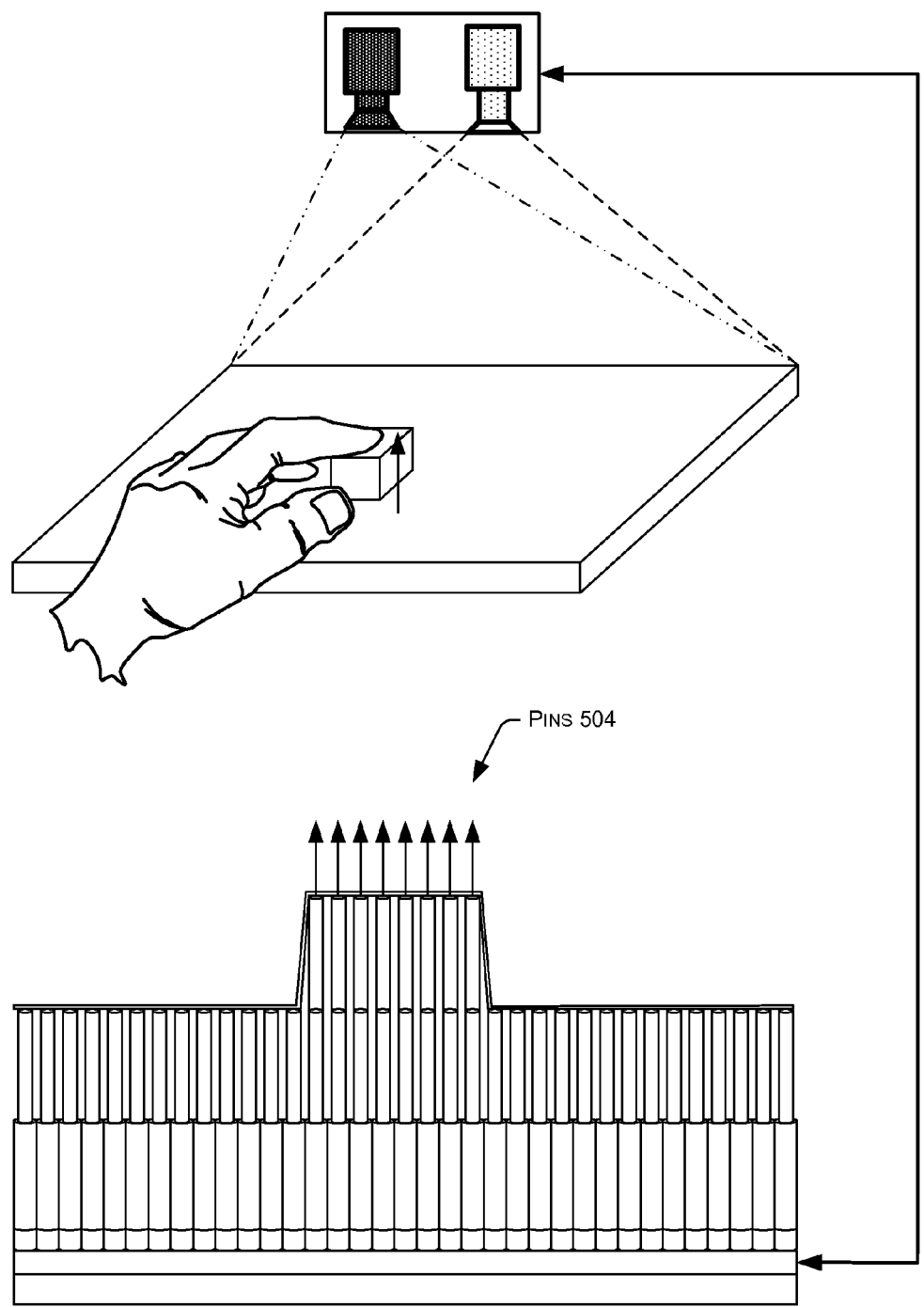

FIG. 5B illustrates that, in response to receiving the instruction, the driver 206 has driven each of the pins 504 forming the button downwards. Thereafter, and as shown in FIG. 5C, the driver 206 drives these pins 504 back to their initial vertical position. By driving the pins in this manner, the UI 104 may simulate the feel of a user pressing a button on a traditional keyboard. Furthermore, while FIG. 5B illustrates the driver 206 driving the pins downwards, in other implementations the actuators may provide a natural resistance that allows the user to depress the pins. Here, when the user removes the force from pins, the actuators may reposition the pins in their initial vertical position. Furthermore, while FIGS. 5A-5C illustrate a single depressible button, in some instances the configurable UI 104 may form an entire keyboard and the projector may project corresponding symbols onto the UI 104 (e.g., symbols corresponding to a QWERTY keyboard). The configurable UI 104 may similar take the form of a dial pad (e.g., for a phone) or another type of device.

Example ARFN

Figure 6:
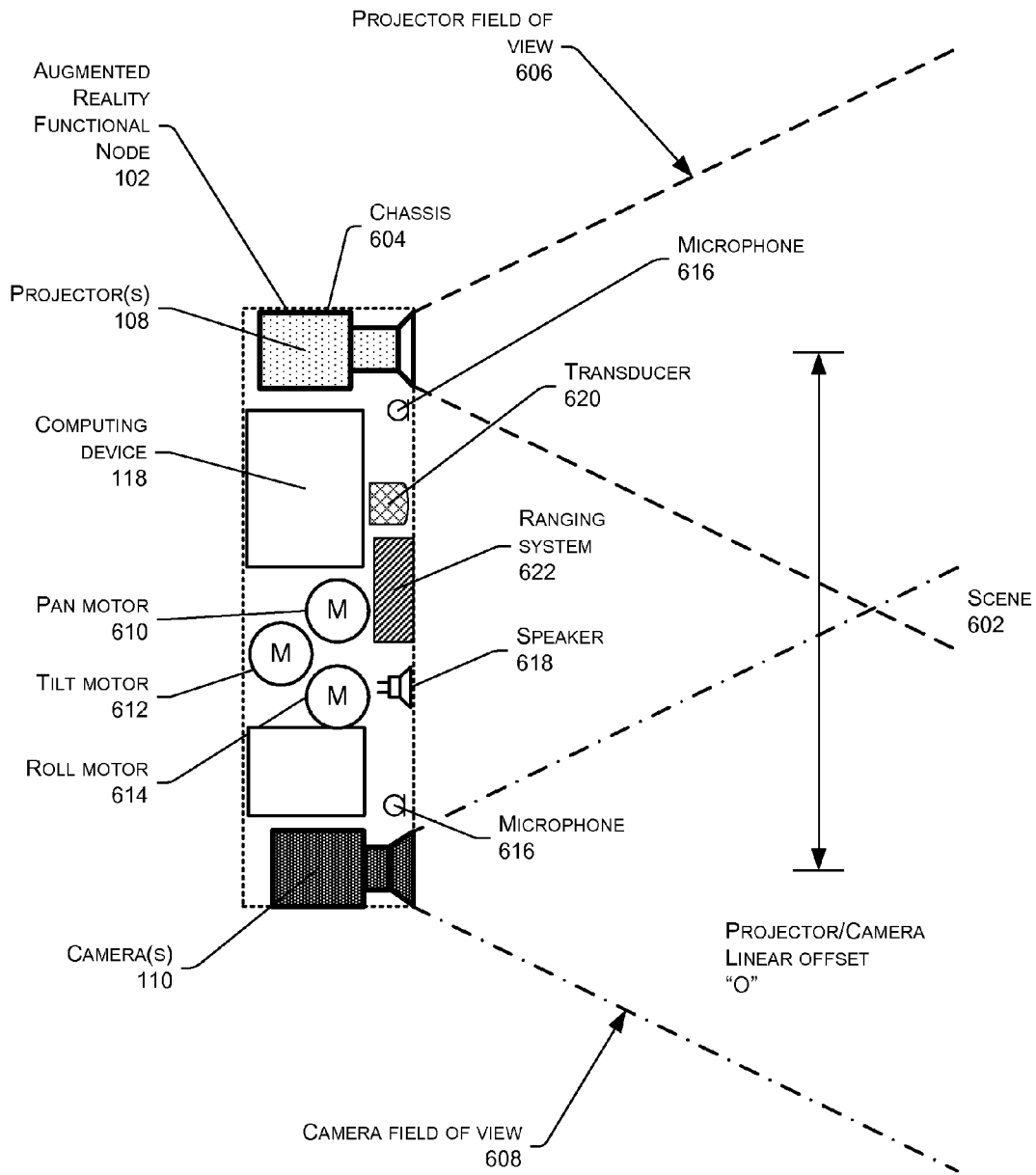
FIG. 6 illustrates an example augmented reality functional node that includes a computing device, a projector, a camera, and other selected components.

FIG. 6 shows additional details of an example ARFN 102 that may be configured to identify when a user attempts to modify a control on a configurable user interface and, in response, send an instruction to the configurable user interface to physically modify the control and/or provide additional haptic feedback. The ARFN 102 is configured to scan at least a portion of a scene 602 and the objects therein, such as the example environment 100. The ARFN 102 may also be configured to provide augmented reality output, such as images, sounds, and so forth. A chassis 604 holds the components of the ARFN 102. One or more projectors 108 may be disposed within the chassis 604 and may be configured to generate and project images into the scene 602. These images may be visible light images perceptible to the user, visible light images imperceptible to the user, images with non-visible light, or a combination thereof. This projector 108 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 108 has a projector field of view 606 which describes a particular solid angle. The projector field of view 606 may vary according to changes in the configuration of the projector. For example, the projector field of view 606 may narrow upon application of an optical zoom to the projector.

One or more cameras 110 may also be disposed within the chassis 604. The camera 110 is configured to image the scene in visible light wavelengths, non-visible light wavelengths, or both. The camera 110 has a camera field of view 608 that describes a particular solid angle. The camera field of view 608 may vary according to changes in the configuration of the camera 110. For example, an optical zoom of the camera may narrow the camera field of view 608.

The chassis 604 may be mounted with a fixed orientation, or may be coupled via an actuator to a fixture such that the chassis 604 may move. Actuators may include piezoelectric actuators, motors, linear actuators, and other devices configured to displace or move the chassis 604 or components therein such as the projector 108 and/or the camera 110. For example, in one implementation the actuator may comprise a pan motor 610, a tilt motor 612, a roll motor 614, and so forth. The pan motor 610 is configured to rotate the chassis 604 in a yawing motion. The tilt motor 612, meanwhile, is configured to change the pitch of the chassis 604. The roll motor 614 is configured to move the chassis 604 in a rolling motion. By panning, tilting, and/or rolling the chassis 604, different views of the scene may be acquired.

One or more microphones 616 may be disposed within the chassis 604, or elsewhere within the scene 602. These microphones 616 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 618 may also be present to provide for audible output. For example, the speakers 618 may be used to provide output from a text-to-speech module or to playback pre-recorded audio.

A transducer 620 may be present within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include an additional ranging system 622. The ranging system 622 is configured to provide distance information from the ARFN 102 to a scanned object or set of objects. The ranging system 622 may comprise radar, light detection and ranging (LIDAR), ultrasonic ranging, stereoscopic ranging, and so forth. In some implementations the transducer 620, the microphones 616, the speaker 618, or a combination thereof may be configured to use echolocation or echo-ranging to determine distance and spatial characteristics.

In this illustration, the computing device 118 is shown within the chassis 604. However, in other implementations all or a portion of the computing device 118 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 108 and the camera 110. Placement of the projector 108 and the camera 110 at distance "O" from one another may aid in the recovery of structured light data from the scene. The known projector/camera linear offset "O" may also be used to calculate distances, dimensioning, and otherwise aid in the characterization of objects within the scene 602. In other implementations the relative angle and size of the projector field of view 606 and camera field of view 608 may vary. Also, the angle of the projector 108 and the camera 110 relative to the chassis 604 may vary.

In other implementations, the components of the ARFN 102 may be distributed in one or more locations within the environment 100. As mentioned above, microphones 616 and speakers 618 may be distributed throughout the scene. The projector 108 and the camera 110 may also be located in separate chassis 604. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 7:
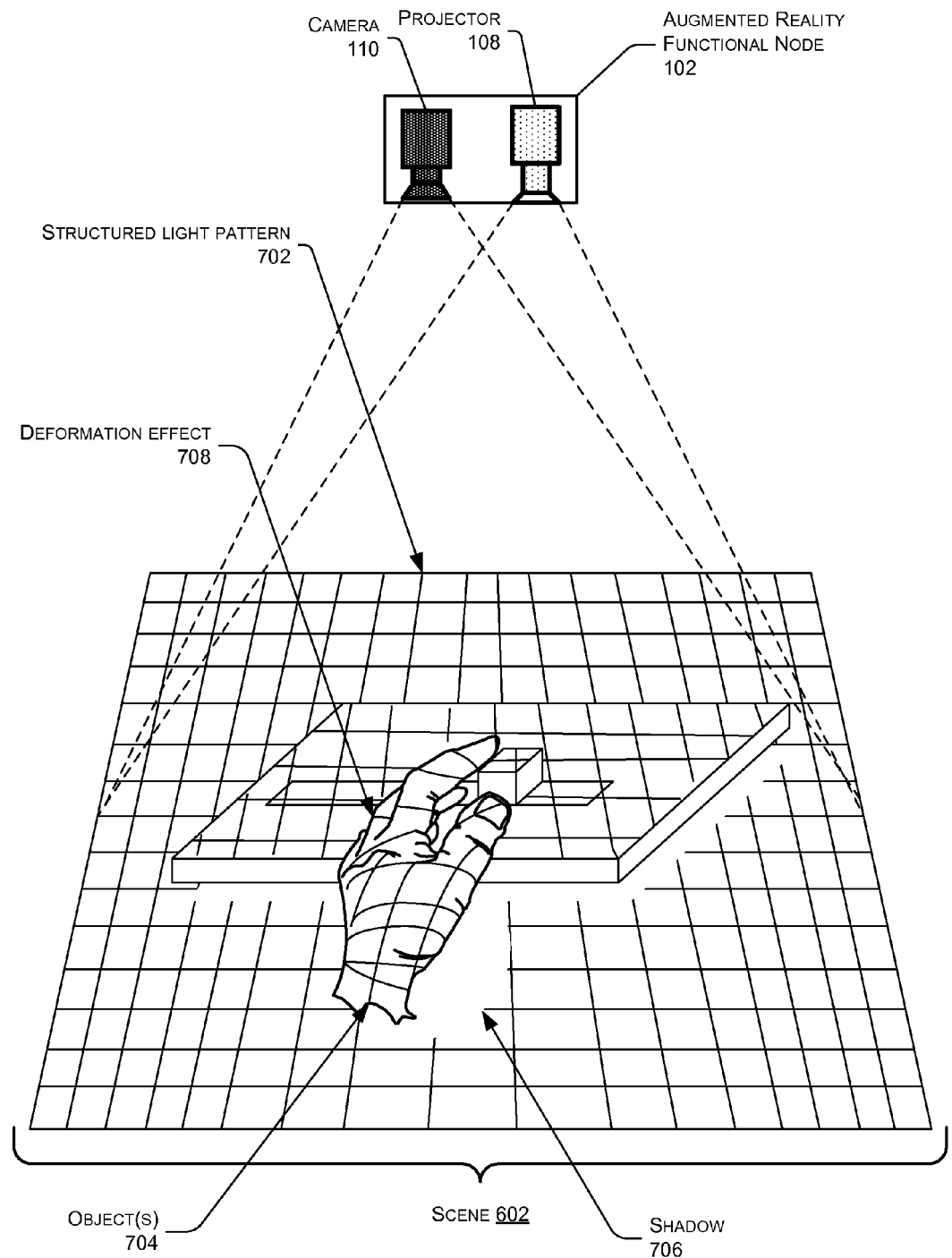
FIG. 7 is an illustrative diagram of the ARFN using structured light to identify surfaces and objects within an environment, such as a control on the configurable UI and a user's manipulations of the control.

FIG. 7 is an illustrative diagram of the ARFN using structured light to identify surfaces and objects within an environment, such as a control on the configurable UI 104 and a user's manipulations of the control. In some instances, the ARFN 102 may use structured light in this manner to identify depths and/or dimensions of objects within a particular scene 602. These techniques are described in detail in pending U.S. patent application Ser. No. 12/977,924, filed on Dec. 23, 2010 and entitled "Characterization of a Scene with Structured Light", which is incorporated in its entirety herein by reference. However, while the structured light techniques of FIG. 7 and the incorporated application provide one example for identifying objects and user interactions within an environment, it is to be appreciated that this information may be determined in any other manner in other embodiments.

In this instant illustration, the projector 108 projects a structured light pattern 702 onto the scene 602. In some implementations, a sequence of different structured light patterns 702 may be used. In other implementations, other devices such as general room lighting may generate structured light patterns. A light fixture, bulb, and so forth may be configured such that emitted light contains one or more modulated structured light patterns 702. For example, two structured light patterns may be presented, each at a different non-visible wavelength within the structure of an incandescent bulb.

The camera 110 used to detect the structured light may also be incorporated into bulbs or assemblies suitable for installation in existing light fixtures. These assemblies may be configured to communicate with the computing device 118 wirelessly or via transmission of a signal via the household electrical wiring. In some implementations, the assembly may provide pre-processing of input prior to sending data along to the computing device 118.

This structured light pattern 702 may be in wavelengths that are visible to the user, non-visible to the user, or a combination thereof. The structured light pattern 702 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows the specific identification and placement of a point or block of pixels within the PN pattern. In some implementations, a plurality of structured light patterns 702 may be used to image the scene. These may include different PN patterns, geometric shapes, and so forth.

In this example, the objects 704 within the environment comprise the configurable UI 104 on a table and a user's hand manipulating the control 106 on the UI 104. A shadow 706 from these objects 704 appears on the table underneath the configurable UI 104 and the user's hand. Inspection of the objects 704 shows a deformation or distortion effect 708 of the structured light pattern 702 as it interacts with the curved surface of the configurable UI 104 and the user's hand. The ARFN 102 may identify the control, the location of the control, and the user's manipulation of the control with reference to this deformation effect 708. In some implementations other effects, such as dispersion of the structured light pattern 702 may be used to provide information on the topology of the scene, which in turn is used to identify controls in the environment and user interactions with these controls.

Example Processes

Figure 8:
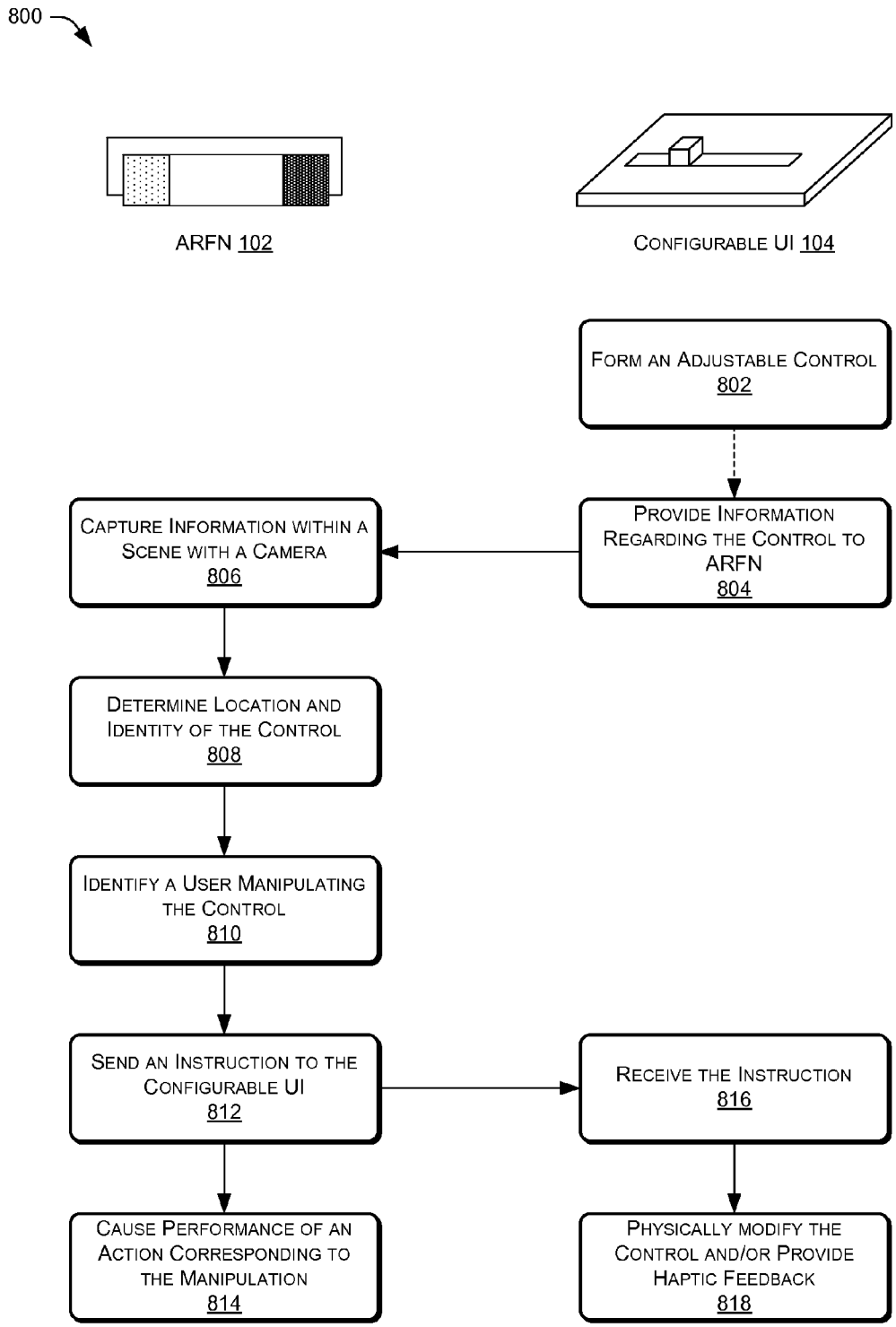
FIG. 8 illustrates an example process for operating a configurable UI within an environment in conjunction with an ARFN.

FIG. 8 illustrates an example process 800 for operating a configurable UI 104 within an environment in conjunction with an ARFN 102. In this example, operations illustrated underneath the ARFN 102 may be performed by the ARFN 102, while operations illustrated underneath the configurable UI 104 may be performed by the configurable UI 104. Of course, in other implementations these operations may be distributed in other manners, such as across multiple ARFNs and/or any other entities.

This process 800 (as well as other processes described throughout) may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented within the architectures described above, as well as within other architectures.

The process 800 includes, at 802, the configurable UI 104 forming an adjustable control, such as any one of the example controls described above or any other type of control. In one example, the UI 104 forms the control by driving different pins to different vertical positions with use of actuators. In some instances, the UI 104 forms the control 106 in response to a user request, either to the configurable UI 104 or to the ARFN 102. For instance, a user may provide a visual gesture or an audible command for a particular control (e.g., a volume control for a stereo, a control for a television, a dial pad for a phone, etc.) to the ARFN 102. In turn, the ARFN 102 may send an instruction to form the control to the configurable UI 104.

At 804, in instances where the user request did not run through the ARFN 102, the configurable UI 104 may provide information regarding the control to the ARFN 102. For instance after forming a particular control (or multiple controls), the UI 104 may provide an identity of this control to the ARFN 102, along with a location of the control on the UI. By providing this information, the ARFN 102 may then be configured to monitor for deformations in a structured light pattern projected at this location, since a user is likely to interact with the control at some point in time. In other instances, meanwhile, the configurable UI 104 does not provide this information to the ARFN 102. Instead, the ARFN 102 may determine the identity and location of the control via information captured by a camera of the ARFN 102. In instances where the user sends the request to the ARFN 102, meanwhile, the ARFN 102 stores the location and identity of the created control for future reference.

At 806 the ARFN 102 captures information of the scene that includes the configurable UI 104 with a camera. For instance, the ARFN 102 may capture, with the camera, deformations in a structured light pattern projected by a projector of the ARFN 102 or of another ARFN. At 808, the ARFN 102 determines a location and identity of the control formed by the configurable UI 104. As discussed above, the ARFN 102 may determine this information in other manners in other instances.

At 810, the ARFN 102 may identify a user manipulating the control formed by the configurable UI 104 and, in response, may identify an instruction to send to the configurable UI 104. The instruction may be based on the identity of the control, the motion of the user, and the like, as described above. At 812, the ARFN 102 may send the determined instruction to the configurable UI 104. At 814, meanwhile, the ARFN 102 may also cause performance of an action corresponding to the user's manipulation of the control. For instance, if the user moved a slider to the right to turn up a volume of a device within the environment, then the ARFN 102 may instruct the device to turn up its volume accordingly.

At 816, the configurable UI 104 receives the instruction from the ARFN 102. In some instances, the instruction not only instructs the configurable UI 104 to physically modify the control in some manner, but may also instruct the configurable UI 104 to provide some sort of haptic or sensory feedback, as described in U.S. patent application Ser. No. 13/083,326, filed on Apr. 8, 2011 and entitled "Augmented Reality Environment With Secondary Sensory Feedback". This sensory feedback may comprise any of the haptic feedback described above, or may comprise directed air pressure, focused heat, vibration, haptically-perceivable sound waves, micro-projectiles (e.g., water pellets) and the like. In these instances, the configurable UI 104 may be configured using the techniques described in the '326 application to provide such sensory feedback to the user when the user manipulates a control (e.g., slides a slider, presses a button, rotates a knob, etc.).

At 818, the configurable UI 104 may execute the instruction by, for example, physically modifying the control and/or providing additional haptic feedback to the user. For instance, the UI 104 may alter a location of the control, enlarge a control, provide feedback to the user by modifying a portion of the control, provide a low current through the control, activate a piezoelectric actuator, or the like.

Figure 9:
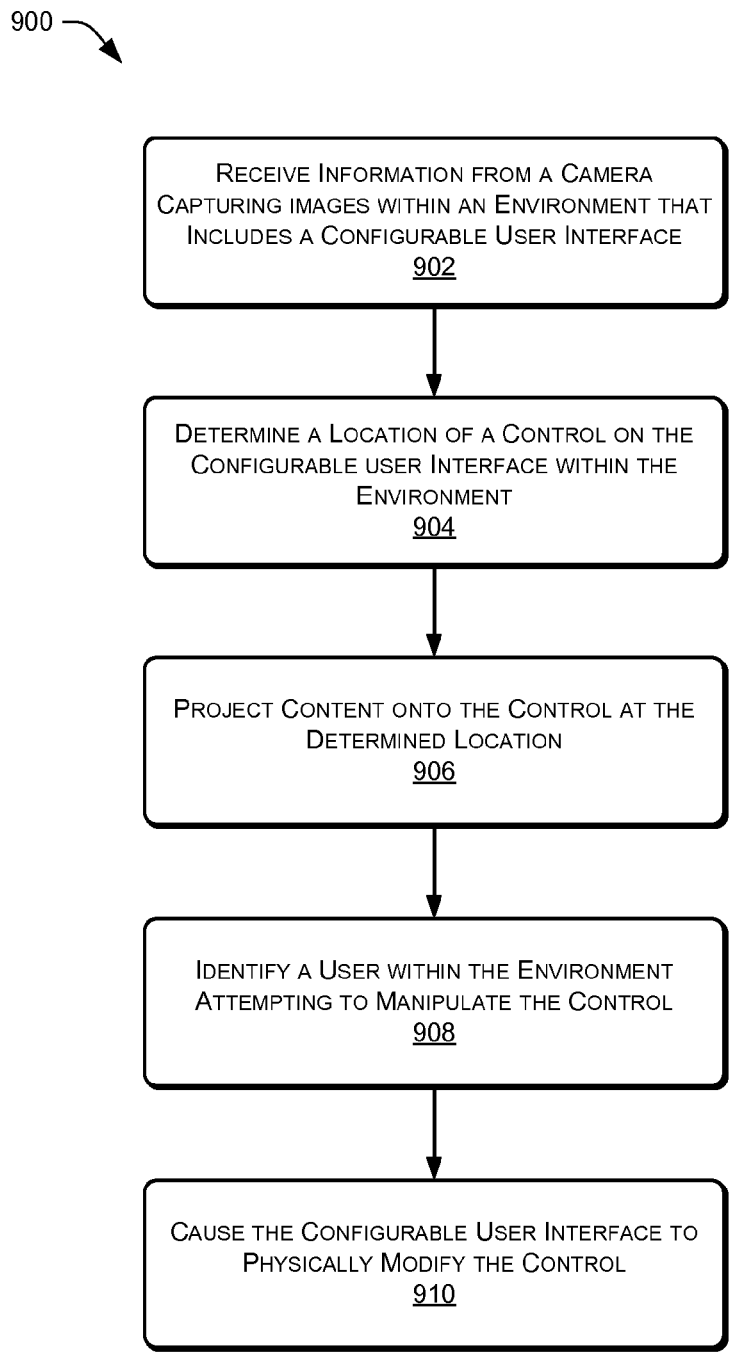
FIG. 9 illustrates another example process for operating a configurable UI within an environment in conjunction with an ARFN.

FIG. 9 illustrates another example process 900 for operating a configurable UI 104 within an environment in conjunction with an ARFN 102. At 902, the process 900 receives information from a camera capturing images within the environment. At 904, the process 900 determines a location of a control on the configurable user interface 104 with use of the information captured by the camera. At 906, the process 900 projects content onto the control at the determined location. As described above, this content may comprise one or more images that correspond to the identified control. In some instances a first AFRN projects a structured light pattern readable by a camera, while a second ARFN projects the image, as illustrated and described above with reference to FIG. 1.

At 908, the process 900 identifies a user within the environment attempting to manipulate the control. For instance, an ARFN may identify this manipulation with reference to deformation in the projected structured light pattern or with use of other techniques. Finally, at a 910 the process 900 may cause the configurable UI 104 to physically modify the control at least partly in response to the identified manipulation.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system, comprising:
one or more processors;
a projector, coupled to the one or more processors and configured to project content onto a configurable user interface within an environment, the configurable user interface comprises multiple pins;
a camera, coupled to the one or more processors and configured to capture information for detecting interaction between a user within the environment and the configurable user interface; and
one or more non-transitory computer-readable media storing computer-executable instructions that, when executed by the one or more processors, cause the one or more processors to perform acts comprising:
identifying, using the information captured by the camera, the user attempting to modify a control on the configurable user interface; and
sending an instruction to the configurable user interface to alter a vertical orientation of at least one pin of the multiple pins of the configurable user interface at least partly in response to the identifying.

2. A system as recited in claim 1, wherein the configurable user interface comprises a hardware device and the identifying comprises identifying the user attempting to physically manipulate the control on the configurable user interface comprising the hardware device.

3. A system as recited in claim 1, wherein the multiple pins are aligned substantially parallel and the configurable user interface further comprises:
multiple actuators to drive the multiple pins to different vertical positions.

4. A system as recited in claim 3, wherein the configurable user interface further comprises:
one or more actuator drivers to: (i) form the control by instructing one or more of the multiple actuators to drive corresponding pins to specified vertical positions, (ii) receive the instruction to physically modify the control, and (iii) physically modify the control by instructing one or more of the multiple actuators to drive corresponding pins to specified vertical positions.

5. A system as recited in claim 3, wherein the configurable user interface further comprises:
a flexible layer residing at least partially atop and covering at least a portion of the multiple pins.

6. A system as recited in claim 1, wherein:
the camera is configured to capture information regarding a location of the control with the environment;
the acts further comprise determining the location of the control using the information regarding the location captured by the camera; and
the projector is configured to project an image onto the control at the determined location of the control.

7. A system as recited in claim 1, wherein:
the control represents a rotatable knob; and
the attempt by the user to modify the control comprises the user attempting to rotate the control representing the rotatable knob.

8. A system as recited in claim 1, wherein:
the control represents a slider;
the attempt by the user to modify the control further comprises the user attempting to slide the control representing the slider; and
the configurable user interface is configured to: (i) lower a vertical position of a first set of pins of the multiple pins of the configurable user interface, and (ii) raise a vertical position of a second set of pins of the multiple pins of the configurable user interface at least partly in response to receiving the instruction to physically modify the control.

9. A system as recited in claim 1, wherein:
the control represents a selectable key;
the attempt by the user to modify the control further comprises the user attempting to press down on the control representing the selectable key; and
the configurable user interface is configured to lower a vertical position of one or more of the multiple pins of the configurable user interface and, thereafter, raise the vertical position of one or more pins of the configurable user interface at least partly in response to receiving the instruction to physically modify the control.

10. A system as recited in claim 1, the acts further comprising sending an instruction to the configurable user interface to provide haptic feedback to the user at the control at least partly in response to the identifying.

11. A system as recited in claim 10, wherein the haptic feedback comprises activating a piezoelectric actuator of the configurable user interface or driving a current through the configurable user interface.

12. An apparatus, comprising:
multiple pins aligned substantially parallel with and adjacent to one another;
at least one actuator configured to drive the multiple pins to different vertical positions; and
at least one actuator driver configured to:
form an adjustable control by instructing the at least one actuator to drive one or more of the multiple pins to specified vertical positions;
receive an instruction to physically modify a configuration of the adjustable control from a computing device that has identified a user sliding the adjustable control in a direction with use of information captured by a camera; and
at least partly in response to receiving the instruction, physically modify the configuration of the adjustable control by instructing the at least one actuator to raise one or more pins in the direction that the user slides the adjustable control and lower pins opposite the direction that the user slides the adjustable control.

13. An apparatus as recited in claim 12, wherein the camera captures information regarding deformation in a projected structured light pattern.

14. An apparatus as recited in claim 12, wherein:
the at least one actuator driver forms the adjustable control by instructing the at least one actuator to drive a first set of the multiple pins to corresponding vertical positions; and
the at least one actuator driver physically modifies the configuration of the adjustable control by instructing the at least one actuator to drive a second, different set of the multiple pins to corresponding vertical positions.

15. An apparatus as recited in claim 12, wherein:
the adjustable control represents a rotatable knob;
the user interacting with the control further comprises the user rotating the rotatable knob; and
the at least one actuator driver physically modifies the configuration of the adjustable control representing the rotatable knob by instructing the at least one actuator to raise or lower pins around a perimeter of the rotatable knob.

16. An apparatus as recited in claim 12, wherein:
the adjustable control represents a depressible button;
the user interacting with the control further comprises the user depressing the depressible button; and
the at least one actuator driver physically modifies the configuration of the adjustable control representing the depressible button by instructing the at least one actuator to lower and then raise pins forming at least a portion of the depressible button.

17. An apparatus as recited in claim 12, wherein the pins are at least partially formed by a ferromagnetic material, and the at least one actuator is configured to drive the multiple pins to the different vertical positions by producing a magnetic field.

18. An apparatus as recited in claim 12, wherein the apparatus comprises multiple actuators, each of the multiple actuators corresponding to and configured to drive a respective pin of the multiple pins.

19. An apparatus as recited in claim 12, further comprising:
a flexible layer residing at least partially atop and covering at least a portion of the multiple pins.

20. An apparatus as recited in claim 12, further comprising:
a substrate residing underneath and coupled to the at least one actuator.

21. An apparatus as recited in claim 12, further comprising:
one or more circuits to create a current in one or more pins of the multiple pins, the at least one actuator driver instructing the one or more circuits to create the current at least partly in response to a user interacting with the adjustable control.

22. An apparatus as recited in claim 12, further comprising one or more strain gauges coupled to one or more of the multiple pins, the one or more strain gauges at least partly for identifying the user interacting with the adjustable control.

23. One or more non-transitory computer-readable media storing computer-executable instructions that, when executed by one or more processors, cause the one or more processors to perform acts comprising:
receiving information captured by a camera imaging an environment;
determining, based at least in part on the information captured by the camera, that a user within the environment is manipulating a control provided by a configurable user interface; and causing the configurable user interface to physically modify the control by altering a vertical orientation of one or more pins of the configurable user interface.

24. One or more non-transitory computer-readable media as recited in claim 23, wherein the camera images the environment for structured light projected with the environment, and the information captured by the camera includes deformations in the projected structured light.

25. One or more non-transitory computer-readable media as recited in claim 23, wherein the one or more pins are aligned substantially parallel with and adjacent to one another and the configurable user interface comprises:
- at least one actuator configured to drive the multiple pins to different vertical positions; and
- at least one actuator driver configured to form and physically modify the control by instructing the at least one actuator to drive the one or more pins to specified vertical positions.

26. One or more non-transitory computer-readable media as recited in claim 23, wherein the configurable user interface comprises a deformable material residing within a conformal container, and wherein the configurable user interface is configured to form and physically modify the control by deforming the deformable material within the conformal container.

27. One or more non-transitory computer-readable media as recited in claim 23, the acts further comprising:
- determining a location of the control within the environment;
- projecting content onto the control at the determined location.

28. One or more non-transitory computer-readable media as recited in claim 23, wherein the control is configured to operate a device within the environment, and the acts further comprising:
- controlling the device within the environment in accordance with the manipulating of the control by the user.

* * * * *